United States Patent [19]
Terhune et al.

[11] 3,865,732
[45] Feb. 11, 1975

[54] EMULSION BREAKER

[75] Inventors: Ralph D. Terhune, James C. Duke, both of Tulsa, Okla.

[73] Assignee: Fram Corporation, East Providence, R.I.

[22] Filed: Nov. 27, 1972

[21] Appl. No.: 309,794

[52] U.S. Cl.................... 210/315, 210/23, 210/489, 210/493, 210/505, 210/DIG. 5
[51] Int. Cl............................................ B01d 25/06
[58] Field of Search............ 210/23, 489, 497, 301, 210/310, 493, DIG. 5, 315, 505

[56] References Cited
UNITED STATES PATENTS

| | | | |
|---|---|---|---|
| 2,883,345 | 4/1959 | Taylor et al. | 210/23 X |
| 3,016,345 | 1/1962 | Price | 210/23 X |
| 3,044,957 | 7/1962 | Dow et al. | 210/DIG. 5 |
| 3,061,107 | 10/1962 | Taylor | 210/DIG. 5 |
| 3,115,459 | 12/1963 | Giesse | 210/DIG. 5 |
| 3,450,632 | 6/1969 | Olson et al. | 210/23 |
| 3,558,482 | 1/1971 | Young | 210/23 |
| 3,591,010 | 7/1971 | Pall | 210/493 |
| 3,617,548 | 11/1971 | Willihnganz | 210/23 |
| 3,800,945 | 4/1974 | Fowler | 210/83 X |

FOREIGN PATENTS OR APPLICATIONS

| | | | |
|---|---|---|---|
| 892,663 | 3/1962 | Great Britain | 210/DIG. 5 |

*Primary Examiner*—Frank A. Spear, Jr.
*Assistant Examiner*—Robert G. Mukai

[57] ABSTRACT

An emulsion breaker featuring a two stage unit, the first stage comprising a resin impregnated fibrous medium including water-resistant, preferentially hydrocarbon-wettable synthetic fibers and having passages therethrough sufficiently fine to trap particles greater than 25 microns in diameter but at least coarse enough to permit passage of particles 1 micron in diameter, and a second stage directly downstream of the first comprising a batt including water-resistant, preferentially hydrocarbon-wettable synthetic fibers for removing from hydrocarbon droplets passing out of the first stage water bubbles surrounding those droplets.

1 Claim, 2 Drawing Figures

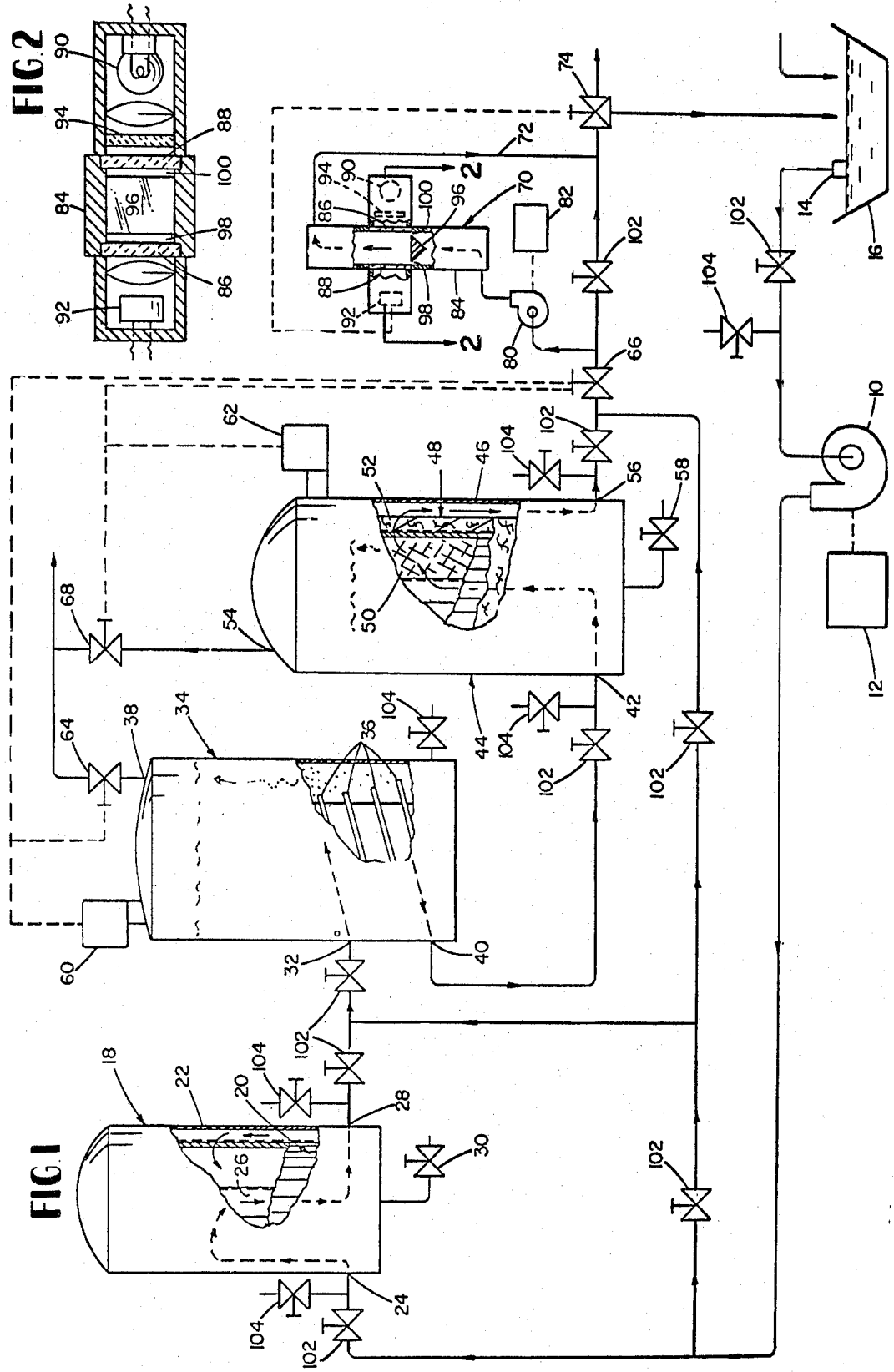

EMULSION BREAKER

BACKGROUND OF THE INVENTION

This invention relates to an emulsion breaker for separating emulsified hydrocarbon from water.

SUMMARY OF THE INVENTION

The invention provides a mechanical emulsion breaker capable of removing even small amounts of emulsified oil from a water stream, of simple, long lasting construction capable of being cleaned for reuse.

In general the invention features a two stage unit, the first stage comprising a resin impregnated fibrous medium including water-resistant, preferentially hydrocarbon-wettable synthetic fibers and having passages therethrough suffficiently fine to trap particles greater than 25 microns in diameter but at least coarse enough to permit passage of particles 1 micron in diameter, and a second stage directly downstream of the first comprising a batt including water-resistant, preferentially hydrocarbon-wettable synthetic fibers for removing from hydrocarbon droplets passing out of the first stage water bubbles surrounding those droplets. In preferred embodiments the first stage has a mixture of natural and polyester fibers to provide a sufficiently tight yet water resistant medium; the second stage consists entirely of polyester fibers; and the two stages are concentric, annular elements arranged for radially outward flow.

Other advantages and features of the invention will be apparent from the description and drawings herein of a preferred embodiment thereof.

BRIEF DESCRIPTION OF THE DRAWINGS

FIG. 1 is a semi-schematic, partially broken away diagram of a treatment system; and FIG. 2 is an enlarged sectional view through 2—2 of FIG. 1.

DESCRIPTION OF THE PREFERRED EMBODIMENT

Referring to the drawings, suction pump 10 (low energy to minimize turbulence and emulsification) driven by motor 12 draws wastewater through floating suction pickup 14 from the top of holding tank or reservoir 16, the floating pickup taking advantage of some solids settling in the reservoir and forming the upstream end of a pressurized closed system. The pump delivers the wastewater to preconditioner 18, consisting of an annular replaceable cartridge 20 mounted in a housing 22 to receive flow passing from inlet 24 to the outer surface of the cartridge, through the cartridge radially to its central passage 26, and then out through outlet 28.

Cartridge 20 provides a porous polyester fiber matrix which (due to the preferential affinity of the fibers for hydrocarbon rather than water) tends to gather the free hydrocarbon into enlarged droplets, and which removes, by filtration, solid particles in the 50 micron and above range. The cartridge can be cleaned by backwashing through valve 30, and consists of either a batt wound in successively looser turns on a perforated centertube, or (as shown) a pleated sheet medium.

The preconditioned stream passes from outlet 28 through inlet 32 into conventional gravity separator 34 which, with the aid of tilted plates 36, allows the free and entrained hydrocarbons to float to the top for removal through outlet 38, while the water, now containing substantially only emulsified hydrocarbon, discharges at the bottom through outlet 40 for passage to inlet 42 of emulsion breaker 44.

Emulsion breaker 44 is designed to separate from the water stream any remaining traces of free hydrocarbon, and any emulsified hydrocarbon. It contains in housing 46 an annular cartridge 48 having an inner stage 50 of pleated sheet medium (1–5 micron rating, preferably less than 10 micron, to effectively break the emulsion) between perforated cylindrical shells, including natural and polyester fibers impregnated with melamine or similar resins, the polyester and resins being preferentially wettable by hydrocarbon to provide high wet strength and low pressure drop in the presence of oil-water emulsion, the natural fibers serving to tighten the medium to achieve the needed micron rating; and an outer stage 52 consisting of a polyester batt. The batt is also preferentially oil-wettable, further enhances separation, and removes from the oil droplets and water bubbles surrounding them after the emulsion is broken. Flow through the cartridge is radial from inside to outside. Separated oil is discharged at the top through outlet 54, and water at the bottom through outlet 56. The cartridge is strong enough to withstand cleaning by backwashing through valve 58.

Interface controls 60 and 62 continuously sense the positions of the oil-water interfaces in separator 34 and emulsion breaker 44, respectively, e.g. employing displacer members which are sensitive to changes in buoyancy. These controls provide output signals to equal percentage throttling valves for adjustment of hydrocarbon and water discharge rates to reverse any changes in interface position. Thus, control 60 is connected to valve 64 which controls oil flow through outlet 38, and to valve 66 which controls water flow through outlet 56 and, since the entire system is pressurized, through outlet 40 of separator 34 as well. Should the interface in separator 34 rise toward outlet 38 due to a decrease in hydrocarbon concentration in the incoming stream, control 60 will partially (or fully, if needed) close valve 64, reducing the oil discharge rate, and correspondingly open valve 66, increasing the water discharge rate, both adjustments working to lower the interface and prevent water discharge through oil outlet 38. Conversely, should the interface drop toward water outlet 40, due to, e.g., a slug of oil in the incoming stream, control 60 will open valve 64 and close valve 66, protecting water outlet 40 from oil discharge. Control 62 acts similarly with respect to valve 66 and valve 68 controlling oil flow rate through outlet 54 of the emulsion breaker. Thus, the system continues effective operation despite wide variation in hydrocarbon concentration in the incoming stream, automatically compensating for that variation.

Fluid analyzer 70 continuously samples the water effluent from downstream of valve 66 and returns the sample through line 72 for flow with the rest of the effluent through three-way valve 74, providing a direct readout in parts per million of oil concentration in the stream. In the event oil concentration in the effluent is greater than a first threshold the analyzer actuates valve 74 to recycle the effluent to reservoir 16, while still continuing to sample; in the event the oil concentration reaches a second threshold the system is shut down.

Analyzer 70 includes a 3600 RPM centrifugal pump 80 driven by motor 82, and draws a sample at 25 gallons/minute and highly disperses any oil throughout the sample. The sample is pumped through tube 84 (square cross-section) having opposing windows 86 and 88 through which shines a light beam from bulb 90 to photo-diode 92. Infra-red filter 94 limits the light passing through the sample so that the frequency range at half peak as a result the light intensity sensed by diode intensity is preferably no less than 7500 Angstroms (the preferred filter having a peak of 8000 Angstroms with a half peak bandwidth of 375 Angstroms. 94 is largely independent of turbidity due to solids suspended in the water, thus providing a reading accurately reflecting hydrocarbon concentration, independent of the nature or color of the hydrocarbon.

To avoid clouding of windows 86 and 88, tapered flow divertor 96 defines restricted passages 98 and 100 respectively below the windows, dividing the sample stream in two, and forcing all the liquid to flow through the passages. The resulting fast moving curtains of liquid flowing past the windows prevent accumulation of oil film thereon.

Shut-off valves 102 and sample valves 104 are provided where shown.

The overall treatment system and the fluid analyzer, all as disclosed herein are the joint inventions of Ralph D. Terhune, James D. Conley, and Donald E. Belden.

We claim:

1. An emulsion breaker for removing trace amounts of hydrocarbon from water, comprising
   a housing having an inlet and an outlet,
   a first, radially inner annular element in said housing, having an inlet side communicating with said inlet, and an outlet side,
   a second, radially outer annular element in said housing, having an inlet side communicating with said outlet side of said first element, and an outlet side directly communicating with said outlet of said housing,
   each of said elements having water resistant, preferentially hydrocarbon wettable polyester fibers,
   said first element having natural fibers resin impregnated for water resistance and mixed with said polyester fibers in a ratio such as to provide a tight, sheetlike pleated medium of lower micron rating than that of said second element said micron rating of said first element being between 1 and 25, for coalescing hydrocarbon in said water into droplets,
   said second element having the form of a fibrous batt for removing from said hydrocarbon droplets any water bubbles surrounding them.

* * * * *